(12) United States Patent
Karandikar et al.

(10) Patent No.: US 11,368,818 B2
(45) Date of Patent: Jun. 21, 2022

(54) METHODS AND SYSTEMS FOR USING MULTI-CONNECTIVITY FOR MULTICAST TRANSMISSIONS IN A COMMUNICATION SYSTEM

(71) Applicant: Indian Institute of Technology Bombay, Maharashtra (IN)

(72) Inventors: Abhay Karandikar, Maharashtra (IN); Prasanna Chaporkar, Maharashtra (IN); Pranav Kumar Jha, Haryana (IN); Sadaf Ul Zuhra, Srinagar (IN)

(73) Assignee: INDIAN INSTITUTE OF TECHNOLOGY BOMBAY, Maharashtra (IN)

( * ) Notice: Subject to any disclaimer, the term of this patent is extended or adjusted under 35 U.S.C. 154(b) by 100 days.

(21) Appl. No.: 16/842,021

(22) Filed: Apr. 7, 2020

(65) Prior Publication Data
US 2021/0176603 A1 Jun. 10, 2021

(30) Foreign Application Priority Data
Dec. 10, 2019 (IN) .............................. 201921051123

(51) Int. Cl.
 *H04W 4/06* (2009.01)
 *H04W 76/15* (2018.01)
 *H04L 12/18* (2006.01)
(52) U.S. Cl.
 CPC ............. *H04W 4/06* (2013.01); *H04W 76/15* (2018.02); *H04L 12/189* (2013.01)

(58) Field of Classification Search
 CPC . H04L 12/185; H04L 12/1877; H04L 12/189; H04W 4/06; H04W 76/15; H04W 76/40
 See application file for complete search history.

(56) References Cited

U.S. PATENT DOCUMENTS

| | | | |
|---|---|---|---|
| 9,942,727 B2* | 4/2018 | Shindo | H04W 72/005 |
| 10,966,067 B2* | 3/2021 | Panchal | H04W 4/203 |
| 2005/0043035 A1* | 2/2005 | Diesen | H04W 72/005 725/62 |
| 2011/0013515 A1* | 1/2011 | Lecompte | H04L 69/22 370/312 |

(Continued)

FOREIGN PATENT DOCUMENTS

CN 101754100 A * 6/2010

*Primary Examiner* — Khaled M Kassim
*Assistant Examiner* — Kai Chang
(74) *Attorney, Agent, or Firm* — Hauptman Ham, LLP

(57) ABSTRACT

Methods and systems for using multi-connectivity for multicast transmissions in a communication system. A method disclosed herein includes using multi-connectivity that enables at least one User Equipment (UE) to receive at least one Multimedia Broadcast Multicast Service (MBMS) content from the plurality of BSs at a time on different physical resource blocks. The method further includes enabling the plurality of BSs to maintain independent MBMS sessions for transmitting the at least one MBMS content to the at least one UE without synchronization. The method further includes enabling the at least one UE to combine the at least one MBMS content received from the plurality of BSs or to select a MBMS content from the received at least one MBMS content.

29 Claims, 13 Drawing Sheets

(56) References Cited

U.S. PATENT DOCUMENTS

| | | | |
|---|---|---|---|
| 2013/0044670 A1* | 2/2013 | Jang | H04W 4/06 370/312 |
| 2014/0140237 A1* | 5/2014 | Ma | H04W 24/08 370/252 |
| 2014/0286222 A1* | 9/2014 | Yu | H04L 12/185 370/312 |
| 2016/0014571 A1* | 1/2016 | Lee | H04W 4/06 370/312 |
| 2016/0249266 A1* | 8/2016 | Kim | H04W 36/0007 |
| 2019/0166580 A1* | 5/2019 | Prasad | H04W 36/0007 |

* cited by examiner

METHODS AND SYSTEMS FOR USING MULTI-CONNECTIVITY FOR MULTICAST TRANSMISSIONS IN A COMMUNICATION SYSTEM

CROSS REFERENCE TO RELATED APPLICATION

This application claims the priority of Indian Patent Application No. 201921051123 filed on Dec. 10, 2019, the disclosure of which is hereby incorporated by reference in its entirety.

TECHNICAL FIELD

Embodiments disclosed herein relate to multicast transmission/Multimedia Broadcast Multicast Service (MBMS), and more particularly to use of multi-connectivity for enabling multicast User Equipments (UEs) to receive the same MBMS content from multiple Base Stations (BSs) on different resource blocks.

BACKGROUND

Wireless communication networks (such as Fifth Generation (5G) networks, Long Term Evolution (LIE) networks, or the like) aim at catering to extremely high density of users with at least one service at high data rates. The at least one service can be at least one of audio services, video streaming services, file downloading services, and so on. Multicast transmission/Multimedia Broadcast Multicast Service (MBMS) provides resource efficient ways to cater to the users with such services at the high data rates. The MBMS caters to the users present in a broadcast area or a multicast group with requested content on same resources over a single multicast stream in a limited bandwidth. Therefore, the MBMS satisfies rate and service requirements of the wireless communication networks in an efficient manner.

FIG. 1 depicts a conventional MBMS system. In the conventional MBMS system, content providers forward MBMS content(s) to an MBMS gateway through a Broadcast Multicast Service Centre (BM-SC). The MBMS gateway then transmits packets of the MBMS content to Base Stations (eNodeBs (eNBs)) via Internet Protocol (IP) multicast. The MBMS gateway transmits the packets of the MBMS content to the eNBs with a synchronization protocol (SYNC protocol) to each eNB. Since the eNBs present in a region are served by the same MBMS gateway, the packets of the MBMS content arriving at the eNBs are in synchronization.

The eNBs may be further allowed to transmit the received MBMS content to at least one User Equipment (UE) in at least one of a Single Cell Point to Multipoint (SC-PTM) mode and a MBMS over a Single Frequency Network (MBSFN) mode. In the SC-PTM mode, each eNB can multicast the received MBMS content to the at least one UE independently. In the MBSFN mode, the multiple eNBs present in the MBSFN area may coordinate with each other to multicast the received same MBMS content to the at least one UE in a strict synchronization on the same resources, so that the UE can be provided with a better Signal to Noise Ratio (SNR). However, a requirement of the strict synchronization limits flexibility of MBSFN operations, since all the coordinating BSs need to transmit the MBMS content over the same resources. In addition, the strict synchronization requires a large control overhead to coordinate between the BSs in the MBSFN area.

Further, in MBSFNs, the UE is unaware that it is receiving the same MBMS content from the multiple eNBs (reception of the MBMS content appears as multipath to the UE), since the MBMS content is being transmitted to the UE in synchronization by all the BSs.

OBJECTS

The principal object of embodiments herein is to disclose methods and systems for using multi-connectivity (MC) for multicast transmission/Multimedia Broadcast Multicast Service (MBMS) in a communication system.

Another object of embodiments herein is to disclose methods and systems for enabling at least one User Equipment (UE) to receive at least one same MBMS content from multiple Base Stations (BSs) at a time on different physical resource blocks using the MC.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
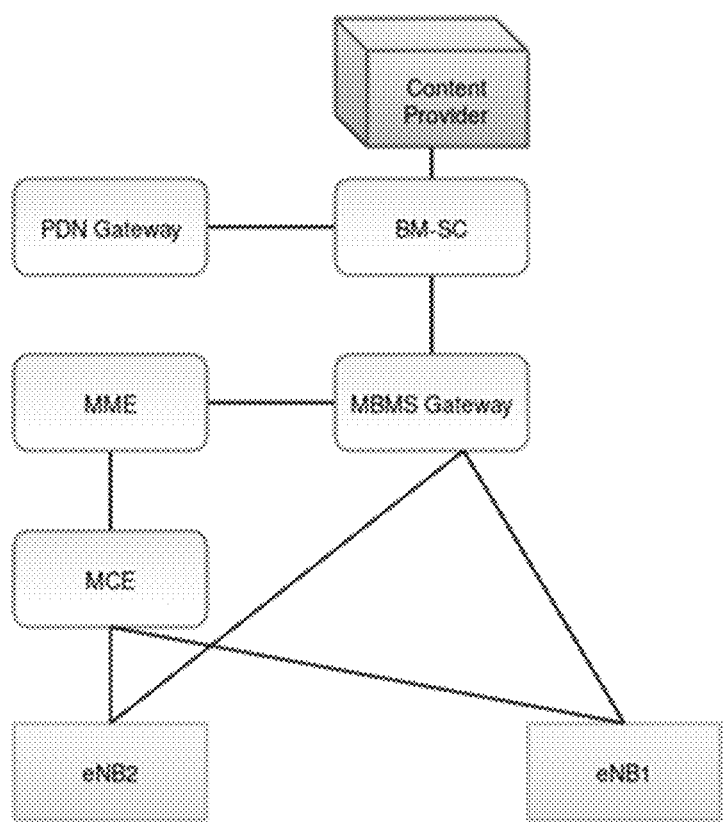
FIG. 1 depicts a conventional Multimedia Broadcast Multicast Service (MBMS) system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Embodiments herein enable multi-connectivity (MC) capable at least one User Equipment (UE) to receive at least one Multimedia Broadcast Multicast Service (MBMS) content from multiple Base Stations (BSs) at a time on different resource blocks.

Embodiments herein enable the at least one UE to combine the received at least one MBMS content or select a MBMS content from the received at least one MBMS content.

Referring now to the drawings, and more particularly to FIGS. 2a through 7, where similar reference characters denote corresponding features consistently throughout the figures, there are shown embodiments.

Figure 2A:
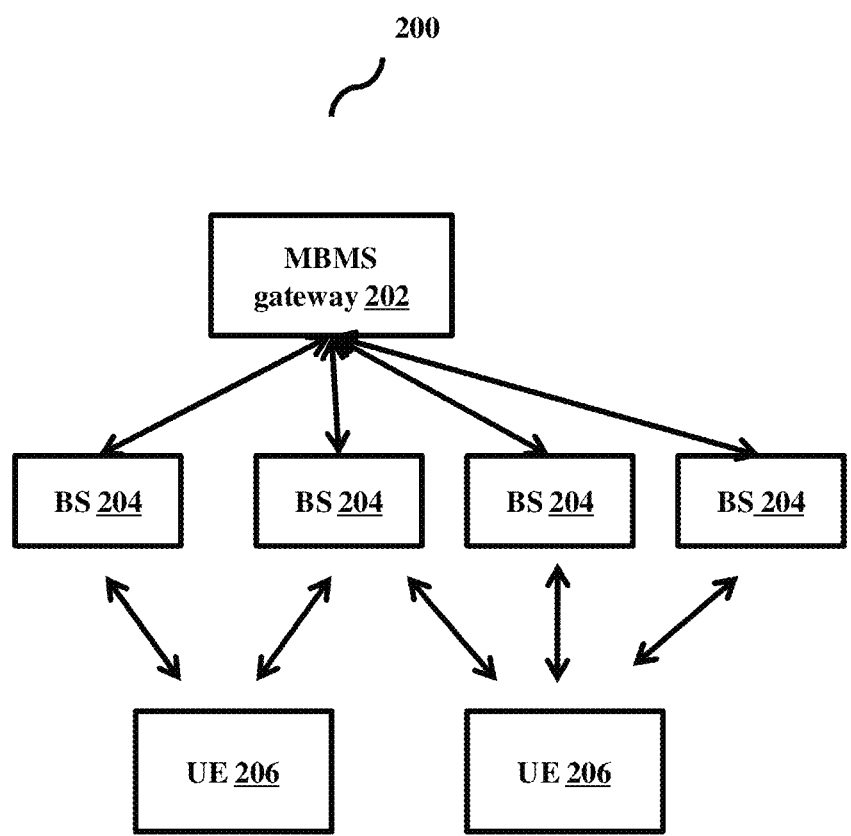
FIGS. 2a and 2h depict a communication system, according to embodiments as disclosed herein.
Figure 2B:
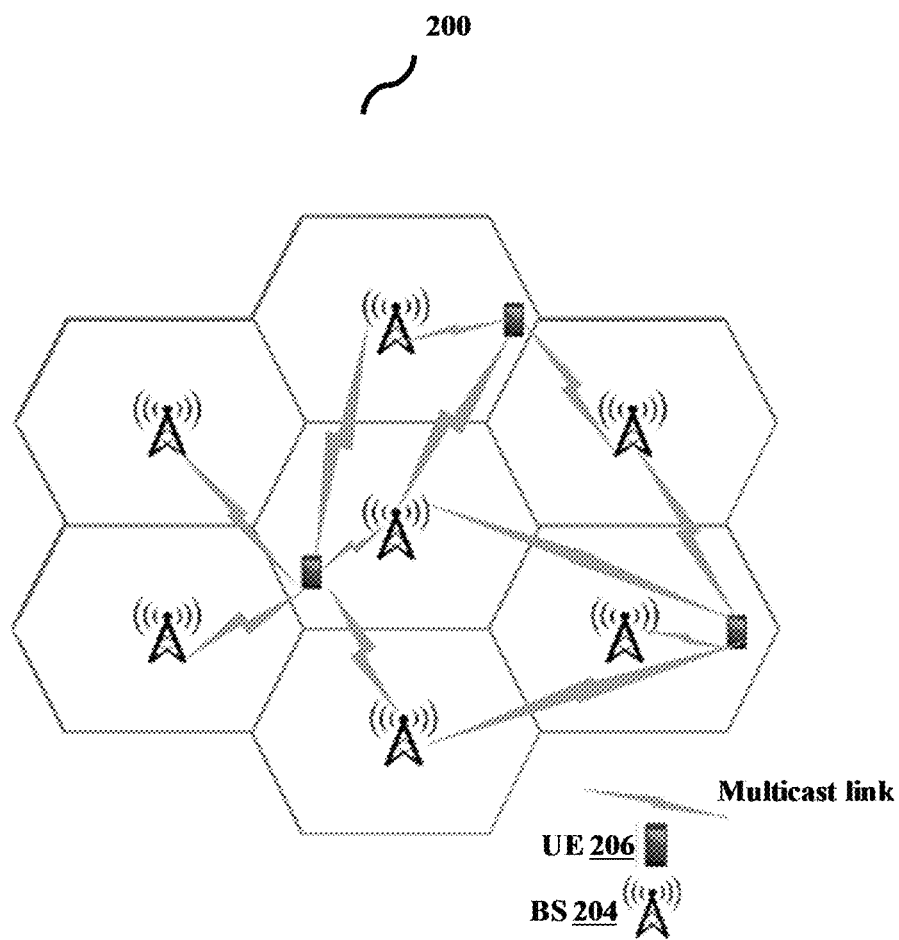

FIGS. 2a and 2b depict a communication system 200, according to embodiments as disclosed herein. The communication system/Multimedia Broadcast Multicast Service (MBMS) system 200 referred herein can be configured to use multi-connectivity (MC) with multicast transmissions (MBMS/evolved MBMS (eMBMS)). The use of the MC with the multicast transmissions allows multiple users to receive MBMS services/contents on different radio resources. Examples of the MBMS services can be, but is not limited to, a streaming service (streaming of multimedia data such as audio, video, text and so on), a file download service, a carousel service (combining file download service and streaming service), a television (TV) service, and so on. Embodiments herein use the terms such as "MBMS contents", "MBMS services", "eMBMS contents", "eMBMS services", "multicast services", and so on interchangeably to refer to broadcast multimedia services that can be provided to the multiple users.

The communication system 200 includes a MBMS gateway 202, a plurality of Base Stations (BSs) 204, and a plurality of User Equipments (UEs) 206.

The MBMS gateway 202 can be a core network gateway positioned between the BSs 204 and a Broadcast Multicast Service Centre (BM-SC) (not shown). The MBMS gateway 202 can be configured to receive the MBMS contents from content providers (not shown) through the BM-SC and transmit the received MBMS contents to the BSs 204. The MBMS gateway uses an Internet Protocol (IP) multicast to transmit the MBMS contents to the BSs.

The BSs 204 can be nodes that can be configured to communicate with the UEs 206. The BSs 204 can be at least one of a macro BS, a micro BS, a femto BS, a pico-BS, and so on. The BSs 204 can communicate with the UEs 206 via a same or different Radio Access Technologies (RATs). Examples of the RATs can be, but is not limited to, a Third Generation Partnership Project (3GPP) $3^{rd}$ Generation (3G), Long Term Evolution (LTE/4G), LTE-Advanced (LTE-A), Fifth Generation (5G) New Radio, Wireless Local Area Network (WLAN), Worldwide Interoperability for Microwave Access (WiMAX/IEEE 802.16), Wi-Fi (IEEE 802.11), Evolved-UTRA (E-UTRA), and so on. The BSs 204 provide at least one cell to the UEs 206, wherein the at least one cell indicates a geographical area in which services (the MBMS services herein) can be offered to the UEs 206. Embodiments herein use the terms such as 'BSs", "cells", "macro-BSs", "pico-BSs", "eNodeBs (eNBs)", "gNBs", and so on, interchangeably to refer to a Base Transceiver System (BTS)/station that communicates with the UEs 206.

The BSs 204 can be configured to serve the UEs 206 with the MBMS contents received from the MBMS gateway 202. The BSs 204 may transmit the MBMS contents to the UE 206 based on unique IP address of the UE 206. Further, the BSs 204 can support and maintain multiple MBMS sessions (corresponding to the MBMS contents), which can be created, modified and terminated by the content providers. In an embodiment, each BS can maintain separate MBMS session in the associated at least one cell for transmitting the MBMS content to the UEs 206. The MBMS session maintained by one BS 204 can be completely independent from the MBMS session maintained by another BS 204 for transmitting the same MBMS content to the UEs 206. Maintaining the independent MBMS sessions by the BSs 204 for the same MBMS content eliminates a need for the BSs 204 to operate in a strict synchronization for transmitting the same MBMS content to the UEs 206. Thus, resulting in improvement of the received MBMS content on account of frequency diversity. Further, in the absence of the strict synchronization, each BS 204 can independently allocate most suitable radio resources for the UEs 206 to receive the MBMS contents. Thus, the BSs 204 can transmit the same MBMS content to the UEs 206 over different radio resources.

The UE(s) 206 referred herein can be a user device supporting the MC. The MC enables the UE 206 to connect to the multiple BSs 204 at a same time. Examples of the UE 206 can be, but not limited to, a mobile phone, a smartphone, a tablet, a phablet, a personal digital assistant (PDA), a laptop, a computer, a wearable computing device, a vehicle infotainment device, an Internet of Things (IoT) device, a Wireless Fidelity (Wi-Fi) router, a USB dongle, or any other processing device supporting the MC. The UE 206 can support multiple Subscriber Identity Modules (SIMs) that can be operated by one or more service providers. The multiple SIMs can support same or different RATs for enabling the UE 206 to communicate with the at least one BS 204.

In an embodiment, the UE 206 can be configured to receive multiple copies of the same MBMS content from the multiple BSs 204 at a time using the MC. For receiving the MBMS content, the UE 206 initially receives information about the MBMS sessions that are available in the communication system 200 through at least one application provided by the content provider(s). Based on the received information about the MBMS sessions, the UE 206 selects the at least one MBMS session, that the UE 206 is interested in and subscribes to the selected at least one MBMS service. The subscribed MBMS session may be available in the associated/camped on cell.

After subscribing to the at least one MBMS session, the UE 206 receives MBMS relevant system information from one or more BSs 204 before start of the subscribed MBMS session. The one or more BSs 204 can be at least one of the BS 204 on which the UE 206 is camped on, the at least one BS 204 with which the UE 206 is connected and at least one neighborhood BS 204 (the BSs present in its vicinity/neighborhood). The MBMS relevant system information can include information such as, but not limited to, a Master information Block (MIB), a System information Block Type 1 (SIB1), a SIB13, and so on. The UE 206 may use the MIB and the SIB1 for connecting to the BSs 204/the communication network 200. The UE 206 may use the SIB13 received from the BSs 204 for determining the availability of the interested MBMS content in the one or more BSs 204.

In an embodiment, the UE 206 may decide to receive the MBMS content from the one or more BSs 204 on determining that the interested MBMS content is available in the one or more BSs 204.

Once the subscribed MBMS session starts, the UE 206 receives information about radio resource allocation for the subscribed MBMS session from the one or more BSs 204. Based on the received information about the radio resource allocation, the UE 206 may receive the multiple copies of the same MBMS content from the one or more BSs 204 at a time on different Physical Resource Blocks (PRBs). Thus, the UE 206 can belong to multiple multicast groups of the same MBMS session, Wherein a multicast group can correspond to each cell and each multicast group can be assigned with a group ID. The group ID of the multicast groups that the UE 206 belongs to may not be same.

In an embodiment, after receiving the MBMS content from the one or more BSs 204, the UE 206 may combine the received multiple copies of the same MBMS content. In an embodiment, the UE 206 may select a copy from the received multiple copies of the same MBMS content and discard remaining copies. Thus, the UE 206 can receive the MBMS content with better Signal to Noise Ratio (SNR).

FIGS. 2a-2b show exemplary elements of the communication system 200, but it is to be understood that other embodiments are not limited thereon. In other embodiments, the communication system 200 may include less or a greater number of units. Further, the labels or names of the units are used only for illustrative purposes and does not limit the scope of the embodiments herein. One or more units can be combined together to perform same or substantially similar function in the communication system 200.

Figure 3A:
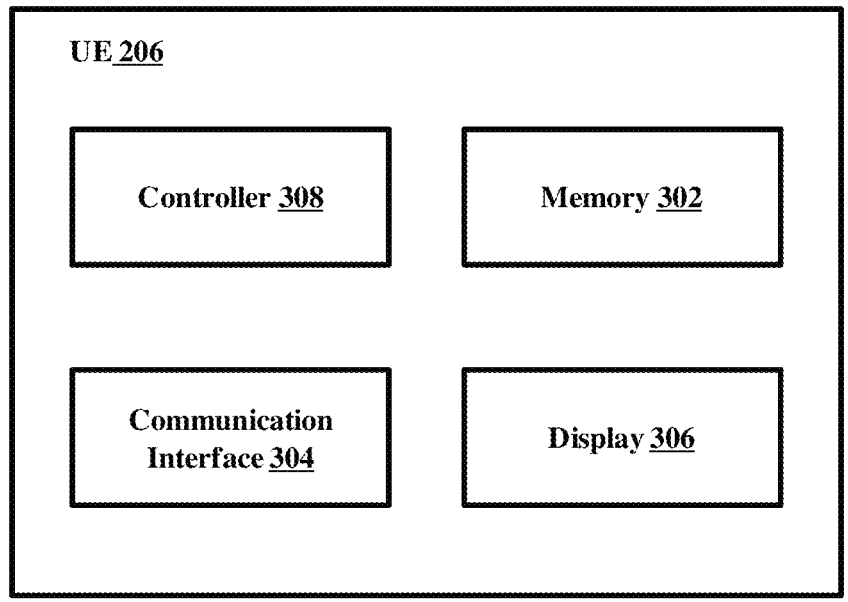
FIGS. 3a and 3h depict a User Equipment (UE) that receives the MBMS content from multiple Base Stations (BSs) at a time, according to embodiments as disclosed herein.
Figure 3B:
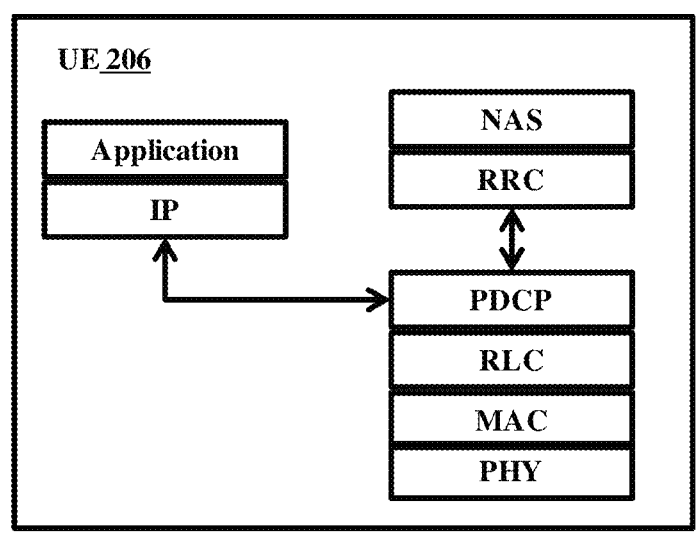

FIGS. 3a and 3b depict the UE 206 that receives the MBMS content from the one or more BSs 204 at a time, according to embodiments as disclosed herein. As illustrated in FIG. 3a, the UE 206 includes a memory 302, a communication interface 304, a display 306, and a controller 308. The UE 206 also includes Radio Frequency (RF) transceivers with antennas, a processing circuitry, processors/Central Processing Units (CPUs), Input/Output modules, and so on (not shown). As illustrated in FIG. 3b, the UE 206 further includes a protocol stack comprising of a Non-Access Stratum (NAS) layer, a Radio Resource Control (RRC) layer, a Packet Data Convergence Protocol (PDCP) layer, a Radio Link Control (RLC) layer, a Media Access Control (MAC) layer, a Physical layer (PHY), an Internet Protocol (IP), and at least one application. The controller 308 can perform at least one intended function by supporting functionalities of the protocol stack.

The memory 302 can store at least one of information about the subscribed MBMS session, the MBMS relevant system information, the MBMS contents, and so on. The memory 302 also includes program code/instructions that can be executed on the controller 308 to perform one or more steps for independently receiving the multiple copies of the same MBMS content from the one or more BSs 204. Examples of the memory 302 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. The memory 302 may also include one or more computer-readable storage media. The memory 302 may also include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory 302 is non-movable. In some examples, the memory 302 can be configured to store larger amounts of information than the memory. In certain examples, a non-transitory storage medium may store data that can, over time, change (e.g., in Random Access Memory (RAM) or cache).

The communication interface 304 can be configured to enable the UE 206 to connect to the BSs 206 via the same or different RATs.

The display 306 can be configured to enable interactions with the user. The display 306 can also be configured to provide the received MBMS content to the users.

The controller 308 can be at least one of a single processer, a plurality of processors, multiple homogeneous or heterogeneous cores, multiple Central Processing Units (CPUs) of different kinds, microcontrollers, special media, and other accelerators. The controller 308 can be configured to enable the UE 206 to receive the same MBMS content from the multiple BSs at a time.

Figure 4:
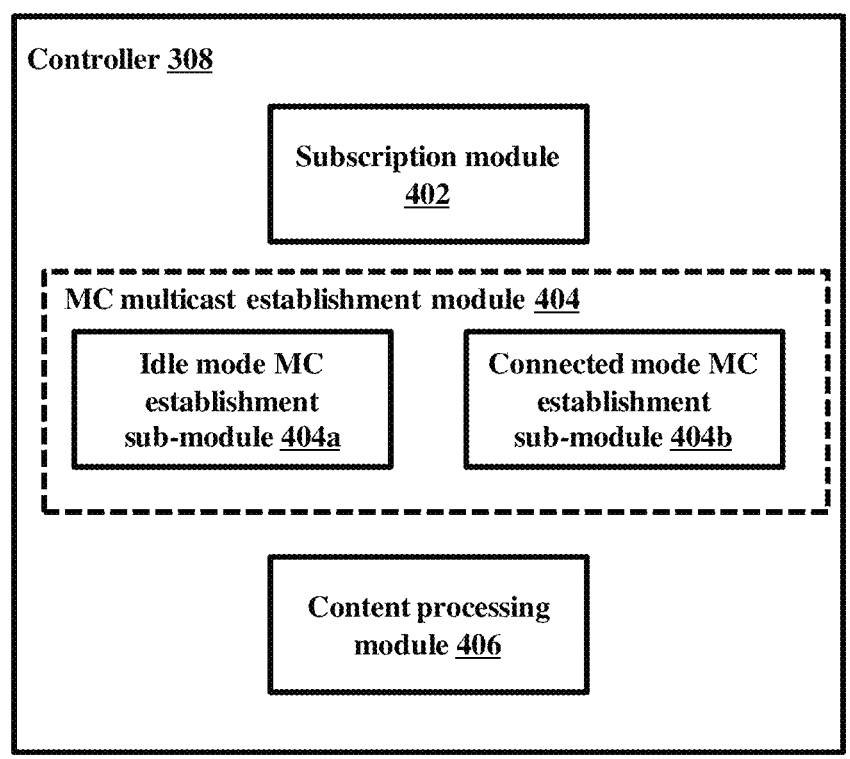
FIG. 4 is a block diagram depicting modules of a controller of the UE for receiving the MBMS content from multiple Base Stations (BSs) at a time, according to embodiments as disclosed herein.

As illustrated in FIG. 4, the controller 308 includes a subscription module 402, a MC multicast establishment module 404, and a content processing module 406.

The subscription module 402 can be configured to subscribe for the at least one MBMS session corresponding to the MBMS content, that the UE 206 is interested in. The subscription module 402 receives information about the MBMS sessions that are available in the cell, wherein the UE 206 is present. On receiving the information about the available MBMS sessions, the subscription module 402 selects the at least one MBMS session from the available MBMS sessions based on interest of the user. The subscription module 402 may subscribe to the at least one MBMS session according to user preferences.

The MC multicast establishment module 404 can be configured to establish the MC multicast for the UE 206 to receive the MBMS content from the multiple BSs at a time. The MC multicast can be established for the UE 206 based on a RRC mode/status of the UE 206. The RRC mode can be at least one of an RRC idle mode, and an RRC connected mode. In the RRC idle mode, there may be no RRC connection establishment for the UE 206, In the RRC connected mode, there may be RRC connection establishment for the UE 206 to exchange the data with the at least one external device/BS 204.

The MC multicast establishment module 404 includes an idle mode MC establishment sub-module 404a, and a connected mode MC establishment sub-module 404b. The idle mode MC establishment sub-module 404a can be operative, when the UE 206 is in the RRC idle mode. The connected mode MC establishment sub-module 404b can be operative, when the UE 206 is in the RRC connected mode.

The idle mode MC establishment sub-module 404a can be configured for establishing the MC multicast for the UE 206, when the UE 206 is in the RRC idle mode. The idle mode MC establishment sub-module 404a identifies the cell/BS 204 on which the UE 206 is camped as well as its neighborhood cells/BSs 204. The idle mode MC establishment sub-module 404a receives control information from the identified cells (including the camped cell and the neighborhood cells). The control information includes information such as, but not limited to, MIB, SIB1, SIB13, and so on. The MIB includes information about at least one of bandwidth of a downlink channel, a number of system frames, a number of antennas, and so on. The SIB1 includes at least one of cell access related information, cell selection information, scheduling information, and so on. The SIB13 includes information about at least one of the available MBMS content, Multicast control channel (MCCH) configurations for receiving the MBMS content, and so on. The idle mode MC establishment sub-module 404a may decode/use the MIB and the SIB1 for enabling the UE 206 to communicate with the communication system 200/BS 204. The idle mode MC establishment sub-module 404a may decode the SIB13 received from the camped cell/BS 204 and the neighborhood cells/BSs 204 to identify the MBMS contents that are available in the camped cell/BS 204 and the neighborhood cells/BSs 204, Based on the SIB13 information, the idle mode MC establishment sub-module 404a determines the availability of the interested MBMS content/MBMS session in the camped cell/BS 204 and the neighborhood cells/BSs 204, from which the UE 206 has received the control information.

In an embodiment, on determining that the interested MBMS content is available in the all camped and neighborhood cells, the idle mode MC establishment sub-module 404a may select one or more cells/BSs 204 from the camped and neighborhood cells/BSs 204 to receive the MBMS content. Further, the idle mode MC establishment sub-module 404a enables the UE 204 to listen to the MCCH corresponding to the selected one or more cells/BSs 204 for receiving radio resource allocation information, once the MBMS session starts. Based on the received radio resource allocation information, the idle mode MC establishment sub-module 404a enables the UE 204 to listen to the Multicast Traffic Channel (MTCH) corresponding to the selected one or more cells/BSs 204 for receiving and decoding MTCH data from the selected one or more cells/BSs 204 independently on the different PRBs. The MTCH data includes the multiple copies of the MBMS content. The connected mode MC establishment sub-module 404b can be configured for establishing the MC multicast for the UE 206, when the UE 206 is in the RRC connected mode. In the RRC connected mode, the UE 206 may already have established an RRC connection to connect to the at least one BS 204 for at least one service (other than the MBMS content) by the time the subscribed MBMS session starts. In such a case, the connected mode MC establishment sub-module 404h may decide to receive the MBMS content from the connected cell/BS 204 and enables the UE 206 to receive the MBMS content from the connected cell/BS 204. The connected mode MC establishment sub-module 404h may also select one or more neighborhood cells/BSs 204 along with the initially connected cell/BS 204 and enable the LIE 206 to receive the MBMS content from all the selected cells/BSs 204.

In an embodiment, in the RRC connected mode, the connected mode MC establishment sub-module 404h establishes the MC multicast for the UE 206 on checking whether the UE 206 is multi-connected or not.

On checking that the UE 206 is connected to a single cell/BS 204, the connected mode MC establishment sub-module 404b receives the relevant SIB13 from the initially connected cell/BS 204 and the control information from the neighborhood cells/BSs 204 when the UE 206 is informed of the available MBMS sessions. The control information includes at least one of the MIB, SIB1, and the SIB13. Based on the SIB13, the connected mode MC establishment sub-module 404b determines for the availability of the interested MBMS content in the connected cell/BS 204 as well as the neighborhood cells/BSs 204. On determining that the interested MBMS content is available in the initially connected cell/BS 204, the connected mode MC establishment sub-module 404h enables the UE 206 to listen to the MCCH corresponding to the initially connected cell/BS 204 for receiving the radio resource allocation information. Based on the radio resource allocation information, the connected mode MC establishment sub-module 404h enables the UE 204 to receive the relevant MTCH data/MBMS content from the initially connected cell/BS 204.

On determining that the interested MBMS content is available in the connected cell/BS 204 as well as the neighborhood cells/BSs 204, the connected mode MC establishment sub-module 404h may select the one or more cells/BSs 204 from the connected cell/BS 204 and the neighborhood cells/BSs 204. In an embodiment, the connected mode MC establishment sub-module 404b may select the one or more cells/BSs 204 based on the availability of the interested MBMS content. On the beginning of the MBMS session corresponding to the interested MBMS content, the connected mode MC establishment sub-module 404b enables the UE 206 to receive the radio resource allocation information from the selected one or more cells/BSs 204 by listening to the MCCH corresponding to the selected one or more cells/BSs 204. Thereafter, the connected mode MC establishment sub-module 404h enables the UE 206 to obtain information about the MTCH corresponding to the selected one or more cells/BSs 204 from the received radio resource allocation information, so that UE 206 can decode the relevant MTCH data from all the multiple cells/BSs 204 on the different PRBs. The decoded MTCH data can be the multiple copies of the MBMS content.

In an embodiment, on checking that the UE 206 is multi-connected, that is the UE 206 is connected to at least two cells/BSs 204 and receiving unicast services from the at least two cells/BSs 204, the connected mode MC establishment sub-module 404b may select the connected at least one cell to receive the MBMS content. Alternatively, the connected mode MC establishment sub-module 404b may select at least one neighborhood cell/BS 204 with which the UE 204 is not connected along with the at least one connected cell/BS 204 to receive the MBMS content independently.

Consider an example scenario, wherein the UE 206 is connected to a primary cell/BS 204 and a secondary cell/BS 204 (that is the UE 206 is dual connected). In such a case, the connected mode MC establishment sub-module 404b receives the SIB13 of the primary cell/BS and the secondary cell/BS 204. In an embodiment, the connected mode MC establishment sub-module 404b may receive the SIB13 of both the primary cell/BS and the secondary cell/BS 204 from the primary cell/BS, wherein the secondary cell/BS 204 may forward the SIB13 to the primary cell/BS 204 over an X2 interface. Thus, the UE 206 may need not to listen to the primary cell/BS and the secondary cell/BS 204 separately for the SIB13.

Based on the received SIB13, the connected mode MC establishment sub-module 404h checks if the interested MBMS session is available in the secondary cell/BS 204. If the interested MBMS session is available in the secondary cell/BS 204, then the connected mode MC establishment sub-module 404b may select both the primary cell/BS and the secondary cell/BS 204 to receive the MBMS content. Thereafter, the connected mode MC establishment sub-module 404b may enable the UE 206 to listen to the MCCH corresponding to the both the primary cell/BS 204 and the secondary cell/BS 204 for receiving the radio resource allocation information. Based on the radio resource allocation information, the connected mode MC establishment sub-module 404b enables the UE 204 to listen to the MTCH corresponding to both the primary cell/BS and the secondary cell/BS 204 for receiving the multiple copies of the same MBMS content from both the primary cell/BS and the secondary cell/BS 204 independently on the different PRBs.

If the interested MBMS session is not available in the secondary cell/BS 204, the connected mode MC establishment sub-module 404b may select the primary cell/BS 204 to receive the MBMS content. Thereafter, the connected mode MC establishment sub-module 404b may enable the UE 206 to listen to the MCCH corresponding to the primary cell/BS for receiving the MBMS content from the primary cell/BS.

In an embodiment, along with the connected primary cell/BS 204 and the secondary cell/BS 204, the connected mode MC establishment sub-module 404h may receive the control information from the one or more neighborhood cells/BSs 204 separately when the UE 206 wants to receive the MBMS content from the multiple cells. The connected mode MC establishment sub-module 404h checks for the availability of the interested MBMS session in the neighborhood cells/BSs 204 based on the received SIB13. If the interested MBMS session is available in the at least one neighborhood cell/BS 204, the connected mode MC establishment sub-module 404b selects the corresponding at least one neighborhood cell 204 along with the primary cell/BS and/or secondary cell/BS 204 to receive the MBMS content. On the beginning of the MBMS session corresponding to the interested MBMS content, the connected mode MC establishment sub-module 404b enables the UE 206 to receive the radio resource allocation from the at least one neighborhood cell and the connected primary cell/BS and/or secondary cell/BS 204 by listening to their corresponding MCCH. Thereafter, the connected mode MC establishment sub-module 404b enables the UE 206 to listen to the MTCH corresponding to the at least one neighborhood cell and the primary cell/BS and/or secondary cell/BS 204 for independently receiving the multiple copies of the same MBMS content at a time. Thus, the UE 206 can receive and combine the MBMS content from the multiple BSs 204 using the MC, which further removes a need for the multiple BSs/cells 204 to operate in the strict synchronization while transmitting the MBMS content to the UE 206.

The content processing module 406 can be configured to perform at least one action on the multiple copies of the same MBMS content that are received from the multiple BSs/cells 204. The at least one action can be, but is not limited to, combining the multiple copies of the same MBMS content, selecting one of the multiple copies of the MBMS content and discarding the remaining copies, and so on. The content processing module 406 can perform the at least one action based on capabilities of the UE 206.

FIGS. 3a-4 show exemplary modules/units of the UE 206, but it is to be understood that other embodiments are not limited thereon. In other embodiments, the UE 206 may include less or a greater number of units. Further, the labels or names of the units are used only for illustrative purpose and does not limit the scope of the embodiments herein. One or more units can be combined together or can be re-arranged to perform same or substantially similar function in the UE 206.

Figure 5:
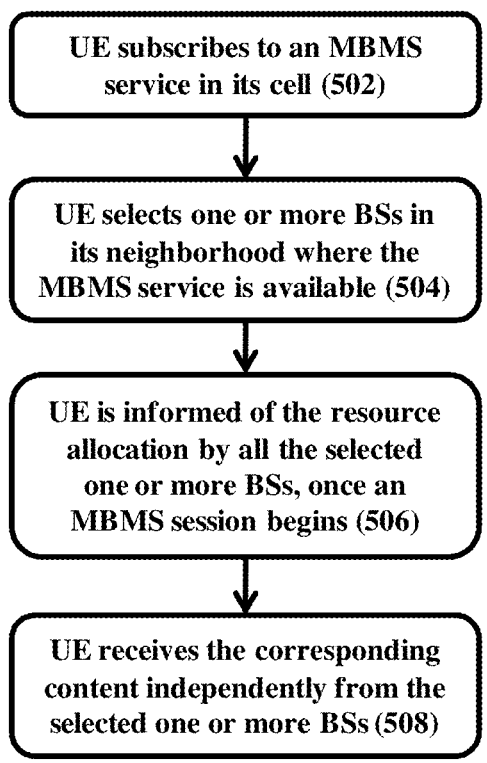
FIG. 5 is an example flow diagram depicting a method for establishing multi-connectivity multicast for the UE to receive the same MBMS content from the multiple BSs, according to embodiments as disclosed herein.

FIG. 5 is an example flow diagram depicting a method for establishing the MC multicast for the UEs to receive the same MBMS content from the multiple BSs, according to embodiments as disclosed herein.

The UE 206 initially subscribes (502) to the MBMS session available in its cell, which the UE 206 is interested in. After subscribing, the UE 206 selects (504) the one or more BSs 204 in its vicinity for receiving the MBMS content. In an embodiment, the UE 206 may select the one or more BSs 204 by determining the availability of the interested MBMS content in the one or more BSs 204 using the SIB13 (included in the control information) received from the one or more BSs 204. In an embodiment, the UE 204 may select the one or more BSs 204 based on the availability of the interested MBMS content. Once the subscribed MBMS session starts and before receiving the corresponding MBMS content, the UE 206 receives (506) the radio resource allocation information by listening to the MCCH corresponding to the selected one or more BSs 204. Based on the radio resource allocation information, the UE 206 receives (508) the multiple copies of the same MBMS content from the one or more BSs 204 independently on the different PRBs by receiving and decoding the MTCH data from the selected one or more BSs 204. Thereafter, the UE 206 combines the multiple copies of the MBMS content or selects the copy of the MBMS content.

FIGS. 6a-6f depict example scenarios of receiving the same MBMS content by the UE 206 from the one or more BSs 204 at a time, according to embodiments as disclosed herein.

Figure 6A:
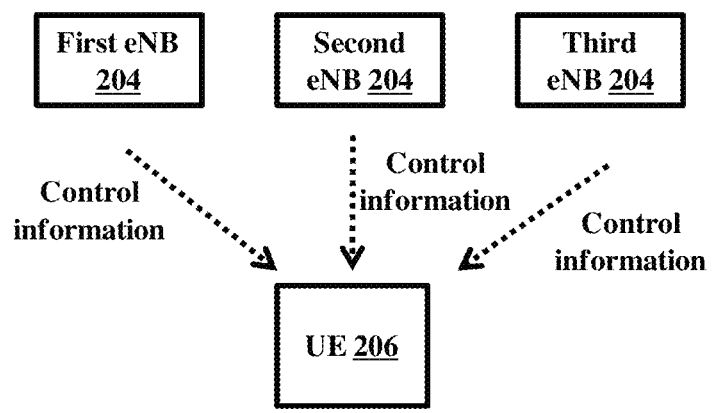
FIGS. 6a-6f depict example scenarios of receiving the same MBMS content by the UE from the multiple BSs at a time, according to embodiments as disclosed herein.
Figure 6A:
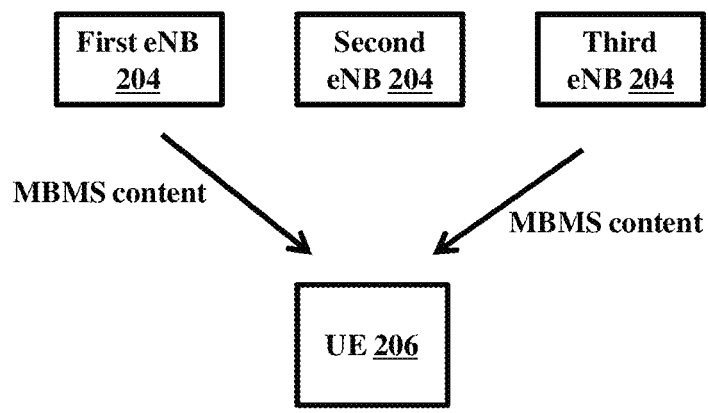
Figure 6B:
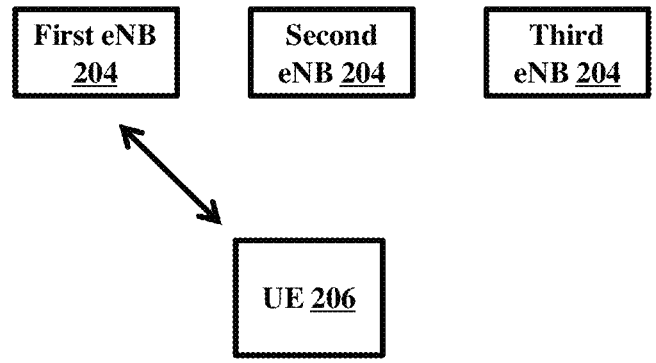
Figure 6B:
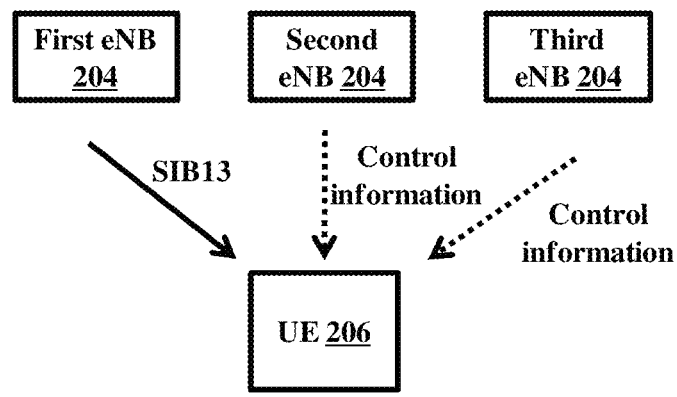
Figure 6B:
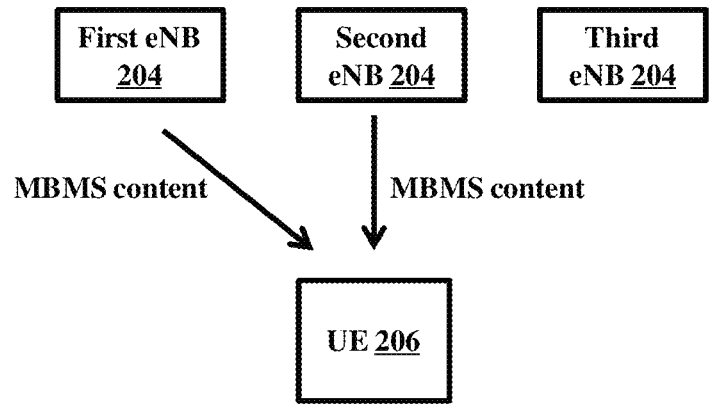

Consider an example scenario as illustrated in FIG. 6a, wherein the UE 206 is in the RRC idle mode (not connected to any of the BSs/eNBs 204) and the UE 206 is camped on the cell provided by the first eNB 204. In such a case, when the UE 206 is interested in receiving the MBMS content, the UE 204 receives the control information from the first eNB 204. The UE 206 also receives the control information from eNBs that are in its vicinity. In an example herein, a second eNB 204 and a third eNB 204 are present in its vicinity. The control information includes the MIB, the SIB1, and the SIB13. Based on the SIB13 received from the three eNBs 204, the UE 206 determines whether the interested MBMS content is available in any of the three eNBs 204. In an example herein, consider that the interested MBMS content is available in the first eNB 204 and the third eNB 204. Thus, based on the availability, the UE 206 listens to the MCCH (which is specified in the SIB13) corresponding to the first eNB 204 and the third eNB 204 for receiving the radio resource allocation information. Based on the radio resource allocation information, the UE 206 receives and decodes the MTCH data from the first eNB 204 and the third eNB 204 by listening to their corresponding MTCH at a time on the different PRBs. The decoded MTCH data can be the multiple copies of the same MBMS content.

Consider an example scenario as illustrated in FIG. 6h, wherein the UE 206 is in the RRC connected mode, and the UE 206 is initially connected to the first eNB 204 (a primary eNB). In such a scenario, the UE 206 may receive the SIB13 from the initially connected first eNB 204 and accordingly listen to the MCCH corresponding to the first eNB 204 for receiving the MBMS content from the first eNB 204. Alternatively, if the UE 206 wants to receive the MBMS content from the multiple eNBs 204, the UE 206 receives the SIB13 from the initially connected first eNB 204 and the control information (the MIB, the SIB1, and the SIB13) from the neighborhood eNBs (for example: the second eNB 204, and the third eNB 204). Based on the received SIB13 from the three eNBs 204, the UE 206 determines that the interested MBMS content is available in the second eNB 204 along with the first eNB 204. Thereafter, the UE 206 listens to the MCCH corresponding to the first eNB 204 and the second eNB 204 for receiving the radio resource allocation information from the first and second eNBs 204. Based on the radio resource allocation information, the LIE 206 receives the relevant MTCH data independently on the different PRBs from the first and second eNBs 204.

Figure 6C:
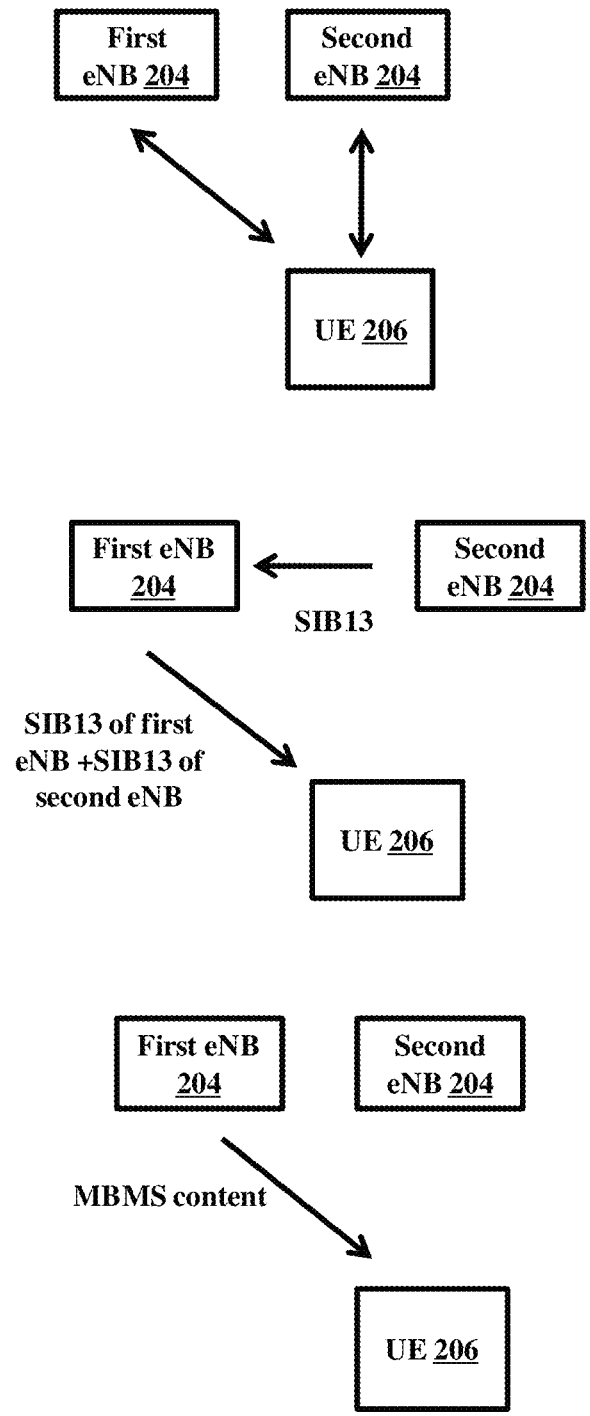
Figure 6D:
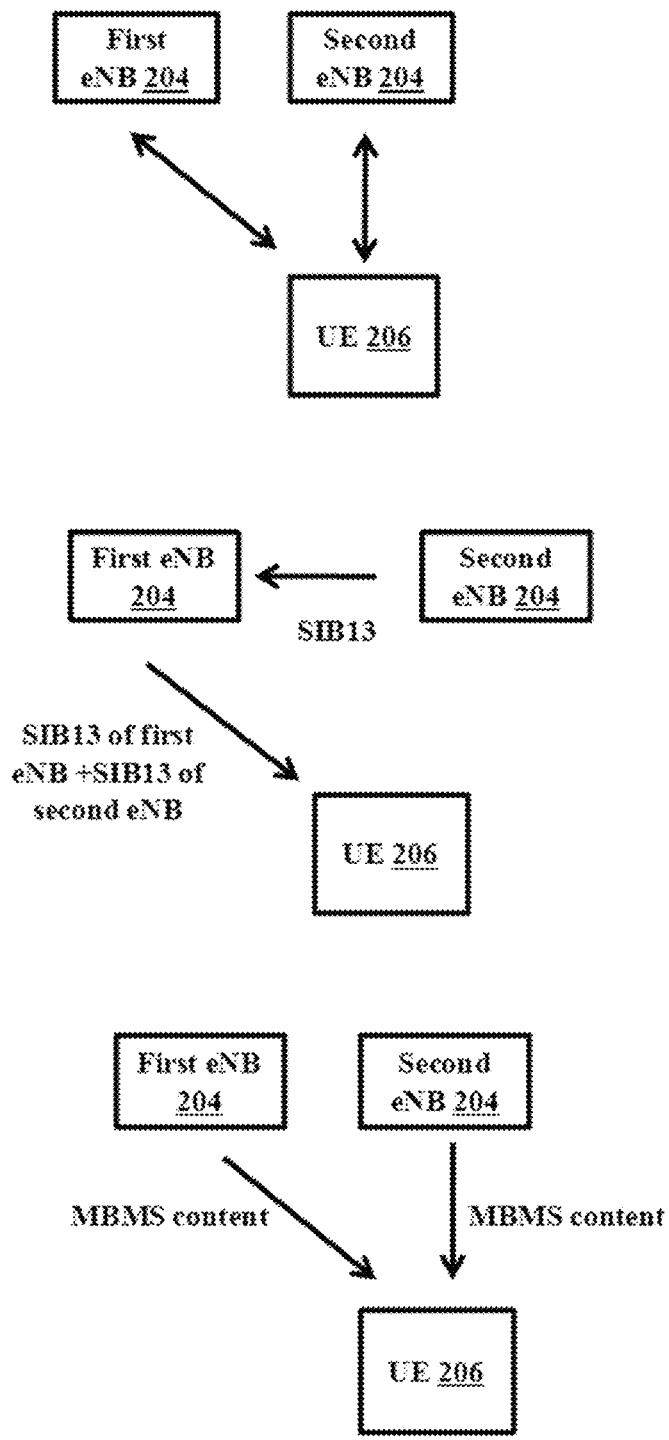

Consider an example scenario as illustrated in FIGS. 6c and 6d, wherein the UE 206 is in the RRC connected mode, and the UE 206 is connected to the first eNB 204 (the primary eNB) and the second eNB 204 (a secondary eNB). In such a scenario, the UE 206 receives the relevant SIB13 of the first eNB 204 and the relevant S. of the second eNB 204 from the first eNB 204 without separately listening to each eNB.

Based on the received SIB13 of the first and second eNBs, the UE 204 determines if the interested MBMS content is available in any of the eNBs 204. On determining that the interested MBMS content is not available in the second eNB 204, the UE 206 selects the first eNB 204 to receive the MBMS content. The UE 206 listens to the MCCH corresponding to the first eNB 204 to receive the MBMS content as illustrated in FIG. 6c.

On determining that the interested MBMS content is also available in the second eNB 204 along with the first eNB 204, the UE 206 may decide to receive the same MBMS content from both the eNBs 204. Thereafter, the UE 206 listens to the MCCH corresponding to the first eNB 204 and the second eNB 204 for receiving the radio resource allocation information from the first and second eNBs 204. Based on the received radio resource allocation information, the UE 206 receives the MTCH data/the multiple copies of the same MBMS content independently on the different PRFs from the first and second eNBs 204 as illustrated in FIG. 6d.

Figure 6E:
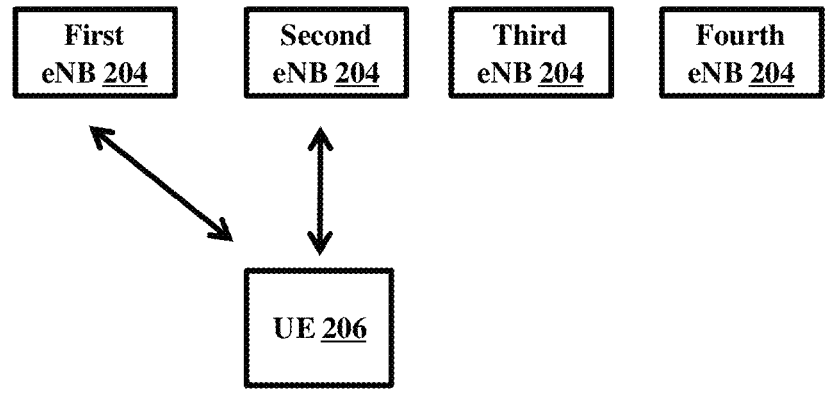
Figure 6E:
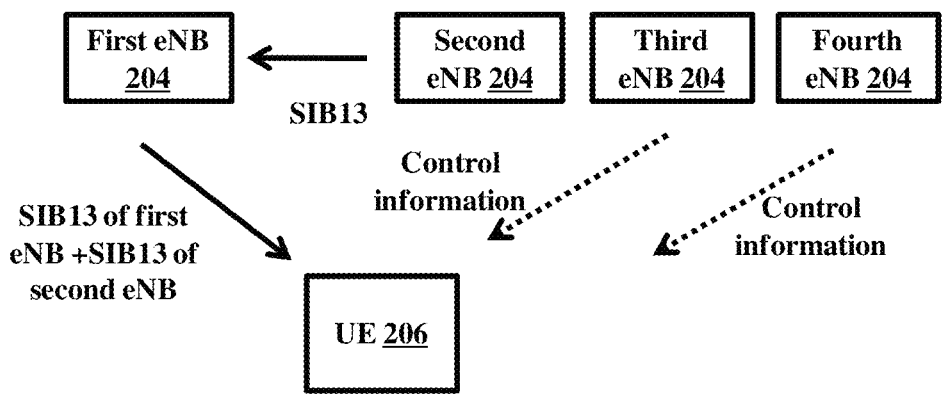
Figure 6E:
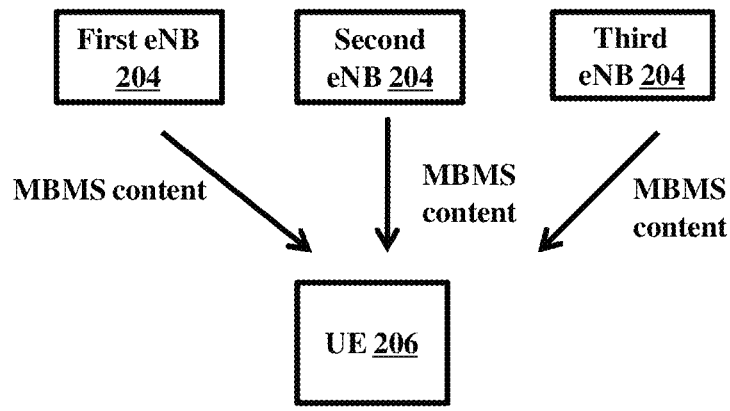

Consider an example scenario as illustrated in FIG. 6e, wherein the UE 206 is connected to the first eNB 204 (the primary eNB) and the second eNB 204 (the secondary eNB) in the RRC connected mode. In such a scenario, the UE 206 receives the relevant SIB13 of the first eNB 204 and the relevant SIB13 of the second eNB 204 from the first eNB 204 and confirms the availability of the same MBMS content in both the first eNB 204 and the second eNB 204. Further, the UE 206 may want to receive the same MBMS content from one or more neighborhood BSs/eNBs. In such a case, the UE 206 receives the control information (the MIB, the SIB1, and the SIB13) broadcasted from the neighborhood eNBs 204 (for example: a third eNB and a fourth eNB). Based on the SIB13 of the third eNB 204, and the fourth eNB 204, the UE 206 determines that the interested MBMS content is available in the third eNB. Thereafter, the UE 206 decides to receive the same interested MBMS content from the first eNB, the second eNB, and the third eNB, since the interested MBMS content is available in the first, second and third eNBs. The UE 206 listens to the MCCH corresponding to the first, second and third eNBs for receiving the radio resource allocation information. Based on the received radio resource allocation information, the UE 206 receives the MTCH data/from the first, second and third eNBs 204 independently on the different PRBs. Thus, the UE 206 can select the multiple eNBs to receive the same MBMS content independently on the different PRBs at a time.

Figure 6F:
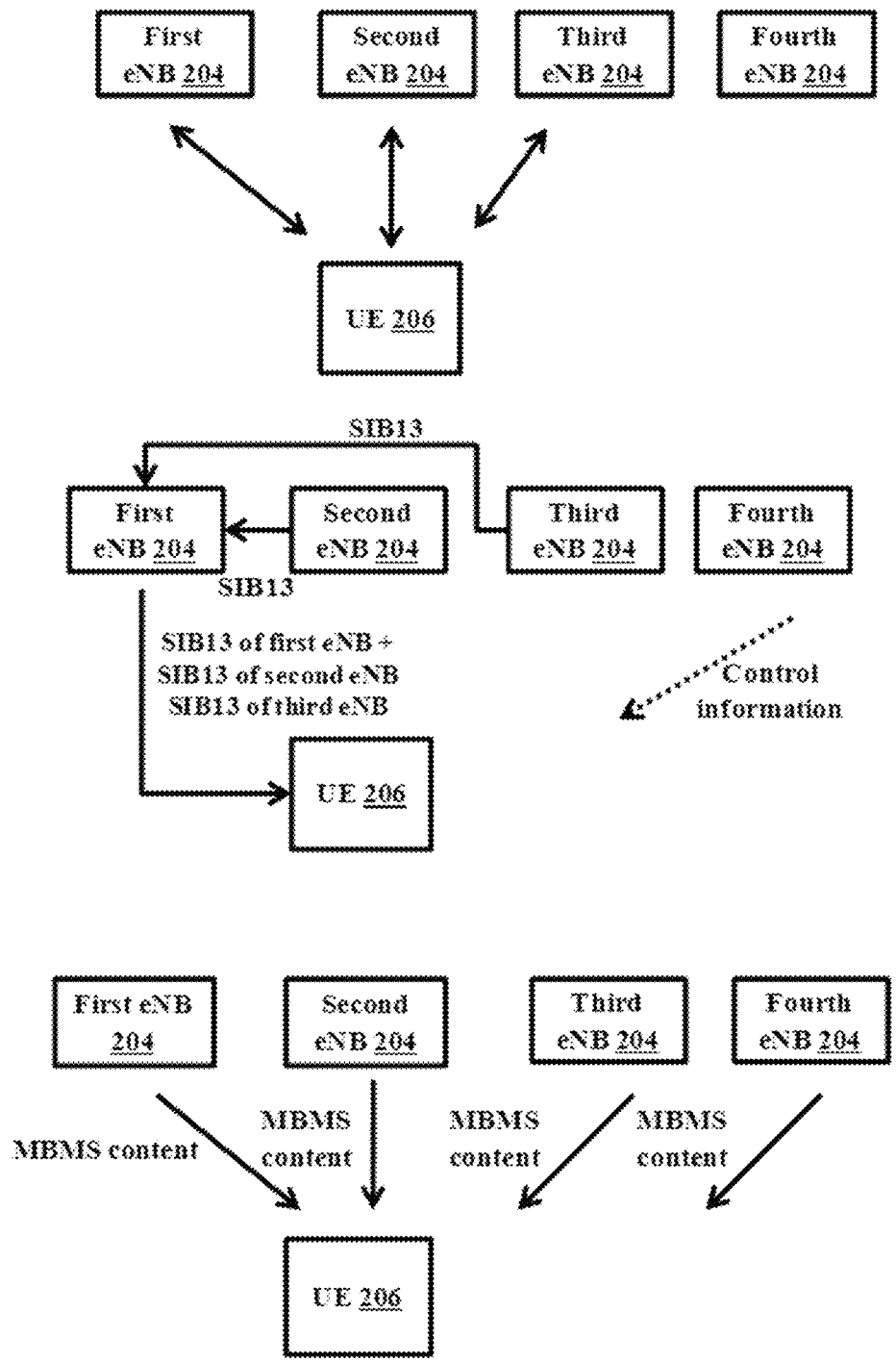

Consider an example scenario as illustrated in FIG. 6f, wherein the MC capable UE 206 is connected to the first eNB 204 (the primary eNB), the second eNB 204 (the secondary eNB) and the third eNB 204 (the secondary eNB). In such a scenario, the UE 206 receives the relevant SIB13 of the first eNB 204 and the relevant SIB13 of the second eNB 204 and the third eNB 204 from the first eNB 204. Based on the received SIB13, the UE 206 determines that the interested MBMS content is available in the first, second and third eNBs 204. In an example herein, the UE 206 further receives the control information from the neighborhood fourth eNB 204 separately. Based on the SIB13 included in the control information of the fourth eNB 204, the UE 206 determines that the interested MBMS content is available in the fourth eNB 204. Thereafter, the UE 206 listens to the MCCH corresponding to the first, second, third and fourth eNBs for receiving the radio resource allocation information, once the interested MBMS session starts. Based on the received radio resource allocation information, the UE 206 receives the relevant MTCH data/from the all the eNBs 204 at a time on the different PRBs. Thus, the UE 206 can receive the same MBMS content from the multiple eNBs at a time using. MC.

Figure 7:
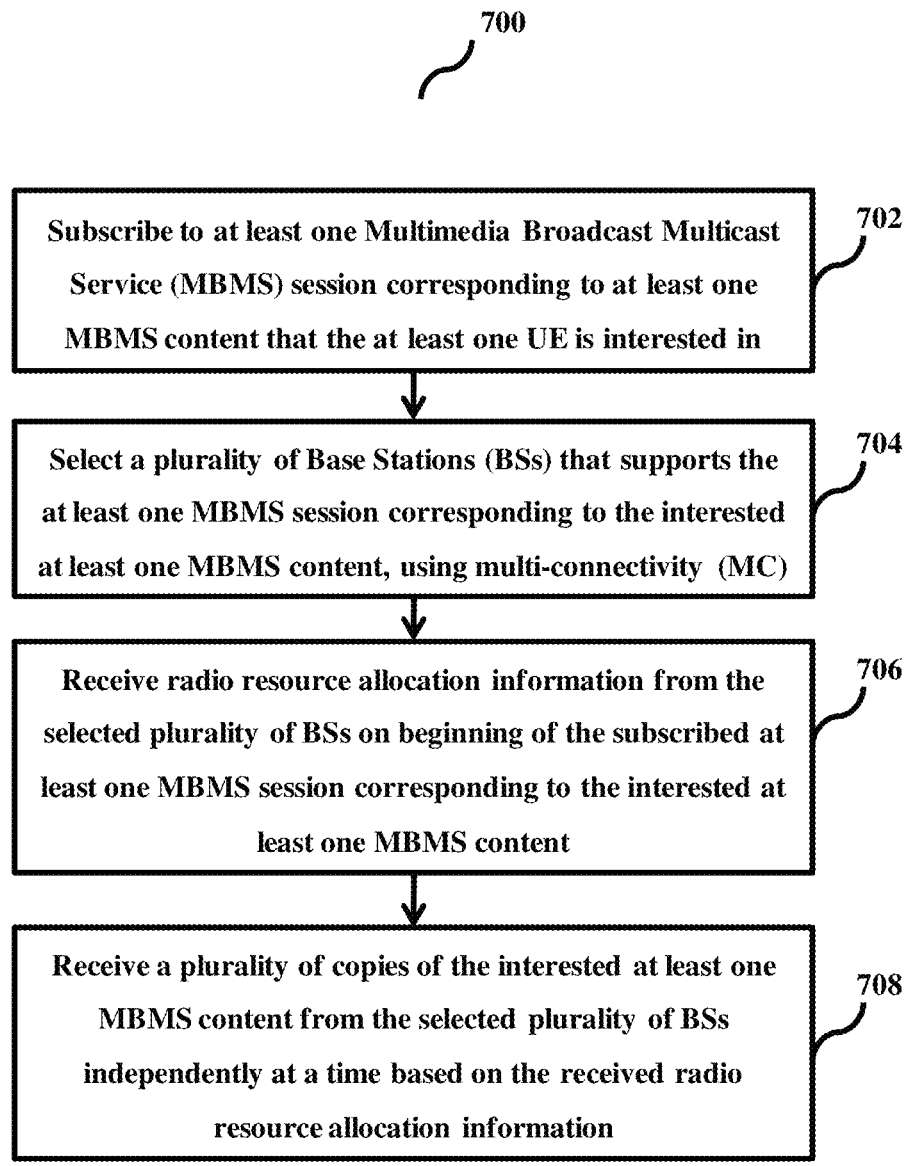
FIG. 7 is a flow diagram illustrating a method for enabling reception of the MBMS content from the multiple BSs on the UE, according to embodiments as disclosed herein.

FIG. 7 is a flow diagram 700 illustrating a method for enabling reception of the same MBMS content from the multiple BSs on the UE 206, according to embodiments as disclosed herein.

At step 702, the method includes subscribing, by the UE 206, to the at least one MBMS session corresponding to at least one MBMS content that the at least one UE 206 is interested in.

At step 704, the method includes selecting, by the UE 206, the plurality of BSs 204 that supports the at least one MBMS session corresponding to the interested at least one MBMS content. The UE 206 receives the MBMS relevant system information blocks (the SIB13) from the plurality of BSs 204 to check if the interested at least one MBMS content is available in the plurality of BSs 204. If the interested at least one MBMS content is available in the plurality of BSs 204, the UE 206 selects the plurality of BSs 206 for receiving the interested at least one MBMS content.

At step 706, the method includes receiving, by the UE 206, the radio resource allocation information from the selected plurality of BSs 204 on beginning of the subscribed at least one MBMS session corresponding to the interested at least one MBMS content. The UE 206 can listen to the selected plurality of BSs for receiving the radio resource allocation information.

At step 708, the method includes receiving, by the UE 206, the plurality of copies of the interested at least one MBMS content from the selected plurality of BSs 204 independently at a time based on the received radio resource allocation information. Based on the received radio resource allocation information, the UE 206 can listen to the MTCH corresponding to the selected plurality of BSs 204 for receiving and decoding the relevant MTCH data. The decoded MTCH data can be the multiple copies of the MBMS content.

The various actions, acts, blocks, steps, or the like in the method and the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

Embodiments herein allows multicast users/User Equipments (UEs) to receive Multimedia Broadcast Multicast Service (MBMS) content from multiple Base Stations (BSs) at a time using multi-connectivity (MC), which results in improvement in MBMS in terms of throughput, spectral efficiency and resource utilization. Further, the use of MC with MBMS can:

replace the use of Single Frequency Networks (SFNs) by providing all the advantages of SFN transmissions while making the operation simpler and considerably more flexible:

eliminate a need for the multiple BSs to operate in synchronization during the transmission of the MBMS content to the UE, which further avoids massive control overhead required to synchronize the transmissions of all the BSs in an MBMS over an SFN (MBSFN) area;

eliminate a need for an extended cyclic prefix, which results in increased system throughput;

allow for greater flexibility in multicast transmissions. In the absence of a need for synchronization, each BS can independently allocate the most suitable resources to the MBMS services. Every BS can thus optimize the resource utilization in its cell; and enable the MC capable user to receive the same MBMS content over different resource blocks. The resulting frequency diversity significantly improves the probability of the content being successfully delivered to the end users.

The embodiments disclosed herein can be implemented through at least one software program running on at least one hardware device and performing network management functions to control the elements. The elements shown in FIGS. 2a-6f can be at least one of a hardware device, or a combination of hardware device and software module.

The embodiments herein disclose methods and systems for using multi-connectivity for multicast transmissions in a communication system. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in at least one embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments and examples, those skilled in the art will recognize that the embodiments and examples disclosed herein can be practiced with modification within the spirit and scope of the embodiments as described herein.

We claim:

1. A method for enabling reception of Multimedia Broadcast Multicast Service (MBMS) on a User Equipment (UE) using multi-connectivity (MC), the method comprising:

subscribing, by the UE, to at least one MBMS session corresponding to at least one MBMS content that the UE is interested in;

selecting, by the UE, a plurality of Base Stations (BSs) that supports the at least one MBMS session corresponding to the interested at least one MBMS content, using the MC, wherein the plurality of BSs transmit the interested at least one MBMS content to the UE based on a unique IP address of the UE, wherein the plurality of BSs maintains the at least one MBMS session independently for transmitting the corresponding at least one MBMS content to the UE, without synchronization, and wherein the at least one MBMS session is created, modified, and terminated by at least one content provider;

receiving, by the UE, radio resource allocation information from the selected plurality of BSs on beginning of the subscribed at least one MBMS session corresponding to the interested at least one MBMS content;

receiving, by the UE, a plurality of copies of the interested at least one MBMS content from the selected plurality of BSs independently at a time on different Physical Resource Blocks (PRBs) based on the received radio resource allocation information; and combining, by the UE, the received plurality of copies of the interested at least one MBMS content.

2. The method of claim 1, wherein the method includes:
selecting, by the UE, a copy from the received plurality of copies of the interested at least one MBMS content.

3. The method of claim 1, wherein the UE is a MC capable UE.

4. The method of claim 1, wherein the plurality of BSs include at least one of a camped Base Station (BS), a primary BS, at least one secondary BS, and at least one neighborhood BS.

5. The method of claim 1, wherein selecting, by the UE, the plurality of BSs depends on a Radio Resource Control (RRC) mode of the UE, wherein the RRC mode includes at least one of an RRC idle mode, and an RRC connected mode.

6. The method of claim 5, wherein the UE selects the plurality of BSs based on availability of the interested at least one MBMS content in the plurality of BSs.

7. The method of claim 5, wherein selecting, by the UE, the plurality of BSs when the UE is in the RRC idle mode includes:

receiving control information from the camped BS and the at least one neighborhood BS, wherein the control information includes at least one of a Master Information Block (MIB), a System Information Block Type 1 (SIB1), and a SIB Type 13 (SIB13);

determining if the interested at least one MBMS content is available in the camped BS and the at least one neighborhood BS using the received SIB13 from the camped BS and the at least one neighborhood BS; and selecting the camped BS and the at least one neighborhood BS as the plurality of BSs that supports the at least one MBMS session corresponding to the interested at least one MBMS content on determining that the interested at least one MBMS content is available in the camped BS and the at least one neighborhood BS.

8. The method of claim 5, wherein selecting, by the UE, the plurality of BSs when the UE is connected to the primary BS in the RRC connected mode includes:
receiving the SIB13 from the primary BS, receiving the control information from the plurality of neighborhood BSs;
determining if the interested at least one MBMS content is available in the primary BS using the received SIB13 from the primary BS and the at least one neighborhood BS using the SIB13 of the control information received from the at least one neighborhood BS; and
selecting the primary BS and the at least one neighborhood BS as the plurality of BSs that supports the at least one MBMS session corresponding to the interested at least one MBMS content on determining that the interested at least one MBMS content is available in the primary BS and the at least one neighborhood BS.

9. The method of claim 5, wherein selecting, by the UE, the plurality of BSs when the UE is connected to the primary BS and the at least one secondary BS in the RRC connected mode includes:
receiving the SIB13 of the primary BS and the SIB13 of the at least one secondary BS from the primary BS;
determining if the interested at least one MBMS content is available in the primary BS and the at least one secondary BS using the received SIB13 of the primary BS and the SIB13 of the at least one secondary BS; and
selecting the primary BS and the at least one secondary BS as the plurality of BSs that supports the at least one MBMS session corresponding to the interested at least one MBMS content on determining that the interested MBMS content is available in the primary BS and the at least one secondary BS.

10. The method of claim 9, wherein the method includes:
receiving, by the UE, the control information from the at least one neighborhood BS;
determining, by the UE, if the interested at least one MBMS content is available in the at least one neighborhood BS using the SIB13 of the control information received from the at least one neighborhood BS; and
selecting, by the UE, the at least one neighborhood BS along with the selected at least one of the primary BS and the at least one secondary BS as the plurality of BSs that supports the at least one MBMS session corresponding to the interested at least one MBMS content on determining that the interested at least one MBMS content is available in the at least one neighborhood BS.

11. The method of claim 1, wherein the UE receives the radio resource allocation information by listening to Multicast Control Channel (MCCH) corresponding to the selected plurality of BSs.

12. The method of claim 1, wherein receiving, by the UE, the plurality of copies of the interested at least one MBMS content from the selected plurality of BSs includes:
obtaining information about Multicast Traffic Channel (MTCH) corresponding to the selected plurality of BSs from the received radio resource allocation information; and
decoding MTCH data from the selected plurality of BSs on different physical resource blocks, wherein the decoded MTCH data includes the multiple copies of the interested at least one MBMS content.

13. A User Equipment (UE) comprising:
a memory; and
a controller coupled to the memory configured to:
subscribe to at least one Multimedia Broadcast Multicast Service (MBMS) session corresponding to at least one MBMS content that the UE is interested in;
select a plurality of Base Stations (BSs) that supports the at least one MBMS session corresponding to the interested at least one MBMS content, using multi-connectivity (MC), wherein the plurality of BSs transmit the interested at least one MBMS content to the UE based on a unique IP address of the UE, wherein the plurality of BSs maintains the at least one MBMS session independently for transmitting the corresponding at least one MBMS content to the UE, without synchronization, and wherein the at least one MBMS session is created, modified, and terminated by at least one content provider;
receive radio resource allocation information from the selected plurality of BSs on beginning of the subscribed at least one MBMS session corresponding to the interested at least one MBMS content;
receive a plurality of copies of the interested at least one MBMS content from the selected plurality of BSs independently at a time on different Physical Resource Blocks (PRBs), based on the received radio resource allocation information; and
combine the received plurality of copies of the interested at least one MBMS content.

14. The UE of claim 13, wherein the controller is further configured to:
select a copy from the received plurality of copies of the interested at least one MBMS content.

15. The UE of claim 13, wherein the UE is a MC capable UE.

16. The UE of claim 13, wherein the plurality of BSs include at least one of a camped Base Station (BS), a primary BS, at least one secondary BS, and at least one neighborhood BS.

17. The UE of claim 13, wherein the controller is configured to select the plurality of BSs depending on a Radio Resource Control (RRC) mode of the at least one UE, wherein the RRC mode includes at least one of an RRC idle mode, and an RRC connected mode.

18. The UE of claim 17, wherein the controller is further configured to select the plurality of BSs based on availability of the interested at least one MBMS content in the plurality of BSs.

19. The UE of claim 17, wherein the controller is configured to select the plurality of BSs when the UE is in the RRC idle mode by:
receiving control information from the camped BS and the at least one neighborhood BS, wherein the control information includes at least one of a Master Information Block (MIB), a System Information Block Type 1 (SIB1), and a SIB Type 13 (SIB13);
determining if the interested at least one MBMS content is available in the camped BS and the at least one neighborhood BS using the received SIB13 from the camped BS and the at least one neighborhood BS; and
selecting the camped BS and the at least one neighborhood BS as the plurality of BSs that supports the at least one MBMS session corresponding to the interested at least one MBMS content on determining that the interested at least one MBMS content is available in the camped BS and the at least one neighborhood BS.

20. The UE of claim 17, wherein the controller is configured to select the plurality of BSs when the UE is connected to the primary BS in the RRC connected mode by:
receiving the SIB13 from the primary BS;

receiving the control information from the plurality of neighborhood BSs;

determining if the interested at least one MBMS content is available in the primary BS using the received SIB13 from the primary BS and the at least one neighborhood BS using the SIB13 of the control information received from the at least one neighborhood BS; and selecting the primary BS and the at least one neighborhood BS as the plurality of BSs that supports the at least one MBMS session corresponding to the interested at least one MBMS content on determining that the interested at least one MBMS content is available in the primary BS and the at least one neighborhood BS.

21. The UE of claim 17, wherein the controller is configured to select the plurality of BSs when the UE is connected to the primary BS and the at least one secondary BS in the RRC connected mode by:

receiving the SIB13 of the primary BS and the SIB13 of the at least one secondary BS from the primary BS;

determining if the interested at least one MBMS content is available in the primary BS and the at least one secondary BS using the received SIB13 of the primary BS and the SIB13 of the at least one secondary BS; and selecting the primary BS and the at least one secondary BS as the plurality of BSs that supports the at least one MBMS session corresponding to the interested at least one MBMS content on determining that the interested MBMS content is available in the primary BS and the at least one secondary BS.

22. The UE of claim 21, wherein the controller is further configured to:

receive the control information from the at least one neighborhood BS;

determine if the interested at least one MBMS content is available in the at least one neighborhood BS using the SIB13 of the control information received from the at least one neighborhood BS; and select the at least one neighborhood BS along with the selected at least one of the primary BS and the at least one secondary BS as the plurality of BSs that supports the at least one MBMS session corresponding to the interested at least one MBMS content on determining that the interested at least one MBMS content is available in the at least one neighborhood BS.

23. The UE of claim 13, wherein the controller is further configured to enable the UE to listen to Multicast Control Channel (MCCH) corresponding to the selected plurality of BSs to receive the radio resource allocation information.

24. The UE of claim 13, wherein the controller is further configured to:

enable the UE to obtain information about Multicast Traffic Channel (MTCH) corresponding to the selected plurality of BSs from the received radio resource allocation information; and enable the UE to decode MTCH data from the selected plurality of BSs on different physical resource blocks, wherein the decoded MTCH data includes the multiple copies of the interested at least one MBMS content.

25. A communication system comprising of a plurality of Base stations and at least one User Equipment (UE), wherein the at least one UE receives at least one Multimedia Broadcast Multicast Service (MBMS) content from the plurality of BSs at a time on different physical resource blocks, wherein the plurality of BSs is configured to:

receive the at least one MBMS content from a MBMS gateway;

maintain at least one MBMS session independently corresponding to the at least one MBMS content without synchronization, wherein the plurality of BSs transmit the interested at least one MBMS content to the UE based on a unique IP address of the UE, and wherein the at least one MBMS session is created, modified, and terminated by at least one content provider;

assign different radio resources for the at least one UE on beginning of the at least one MBMS session corresponding to the at least one MBMS content, that the at least one UE is interested in; and transmit a plurality of copies of the interested at least one MBMS session on the assigned different radio resources to the at least one UE without operating in a synchronization, wherein the UE is configured to:

receive a plurality of copies of the interested at least one MBMS content from the selected plurality of BSs independently at a time based on the received radio resource allocation information; and combine the received plurality of copies of the interested at least one MBMS content.

26. The communication system of claim 25, wherein the plurality of BSs include at least one of a camped Base Station (BS), a primary BS, at least one secondary BS, and at least one neighborhood BS.

27. The communication system of claim 25, wherein the at least one UE is a multi-connectivity (MC) capable UE.

28. The communication system of claim 27, wherein the at least one UE is configured to:

subscribe to the at least one MBMS session corresponding to the at least one MBMS content that the at least one UE is interested in;

receive control information from the plurality of BSs, wherein the control information includes at least one of Master Information Block (MIB), a System Information Block type 1 (SIB1), and a SIB type 13 (SIB13);

determine if the interested at least one MBMS content is available in the plurality of BSs using the SIB13 corresponding to the plurality of BSs;

select the plurality of BSs for receiving the interested at least one MBMS content on determining that the interested at least one MBMS content is available in the plurality of BSs; and receive radio resource allocation from the selected plurality of BSs on beginning of the subscribed at least one MBMS session corresponding to the interested at least one MBMS content.

29. The communication system of claim 28, wherein the at least one UE is further configured to:

select a copy from the received plurality of copies of the interested at least one MBMS content.

* * * * *